United States Patent [19]

Grassano

[11] Patent Number: 4,681,303
[45] Date of Patent: Jul. 21, 1987

[54] SHOCK-ABSORBENT CONNECTOR

[76] Inventor: Vincent R. Grassano, 41 Ridge Rd., Media, Pa. 19063

[21] Appl. No.: 769,252

[22] Filed: Aug. 26, 1985

Related U.S. Application Data

[63] Continuation-in-part of Ser. No. 678,711, Dec. 6, 1984, abandoned, which is a continuation-in-part of Ser. No. 473,045, Mar. 7, 1983, Pat. No. 4,488,511.

[51] Int. Cl.⁴ .............................................. F16F 3/07
[52] U.S. Cl. ..................... 267/8 R; 16/66;
54/34; 119/96; 119/109; 188/1.11; 188/297;
188/311; 267/34; 267/70; 267/72; 267/136;
340/573; 340/668
[58] Field of Search ............ 267/8 R, 34, 70, 71,
267/72, 136; 16/66; 188/1.11, 311, 297;
340/573, 668, 685; 119/96, 109; 54/34

[56] References Cited

U.S. PATENT DOCUMENTS

| Re. 14,674 | 6/1919 | Schmidt | 16/66 |
|---|---|---|---|
| Re. 27,714 | 7/1973 | Waldo | 16/66 |
| 197,615 | 11/1877 | Dawson | 267/70 |
| 198,275 | 12/1877 | Chase | 267/70 X |
| 220,926 | 10/1879 | Luallen et al. | 267/70 |
| 842,339 | 1/1907 | Russo | 340/668 X |
| 1,046,338 | 12/1912 | Schou | 267/8 R |
| 1,194,417 | 8/1916 | Pelham | 119/109 X |
| 1,333,835 | 3/1920 | Coffman | 267/8 R |
| 1,371,124 | 3/1921 | Spangler | 267/8 R |
| 3,109,075 | 10/1963 | Ratcliff | 340/668 X |
| 3,649,786 | 3/1972 | Mauron | 188/1.11 X |
| 4,456,233 | 6/1984 | Muller | 267/70 |
| 4,500,075 | 2/1985 | Tsuchiya et al. | 267/8 R |

FOREIGN PATENT DOCUMENTS

| 2402614 | 7/1975 | Fed. Rep. of Germany | 119/109 |
|---|---|---|---|
| 367046 | 2/1932 | United Kingdom | 119/109 |
| 1407411 | 9/1975 | United Kingdom | 188/1.11 |
| 679724 | 8/1979 | U.S.S.R. | 16/66 |

Primary Examiner—George E. A. Halvosa
Attorney, Agent, or Firm—Robert B. Frailey

[57] ABSTRACT

The invention provides a manually held leash, lead, line or the like for large and strong animals which incorporates a shock absorbing device for diminishing the effect of the force or strain transmitted when the animal suddenly and forcibly pulls, lunges, bolts, jumps, etc. The shock absorber incorporated resilient shock absorbing elements automatically operative to oppose the force exerted by the animal and diminish its effect on the manually held leash. The device is constituted of a pneumatic cylinder the piston of which is connected to the animal and normally is retained in a retracted position by a compressive spring against which the animal pulls. In addition to the restraining force imposed by the spring, compressed air also is utilized to absorb the shock of the animal's pulling force. A command sound, such as a recorded voice, buzzer, or the like, actuated under controlled circumstances and operative to order the animal to halt or obey, may be included. The shock absorbent leash of the invention reduces the potential for injury to a person holding the leash, in the event the animal exerts a sudden and substantial force thereon. The invention has a variety of other applications where connectors joining two separate entities, bodies or objects are subjected to sudden force or strain. Examples of such connectors are vehicle tow lines, tie down lines for aircraft, tent guy ropes, mooring lines for boats, swing chains, and the like.

16 Claims, 8 Drawing Figures

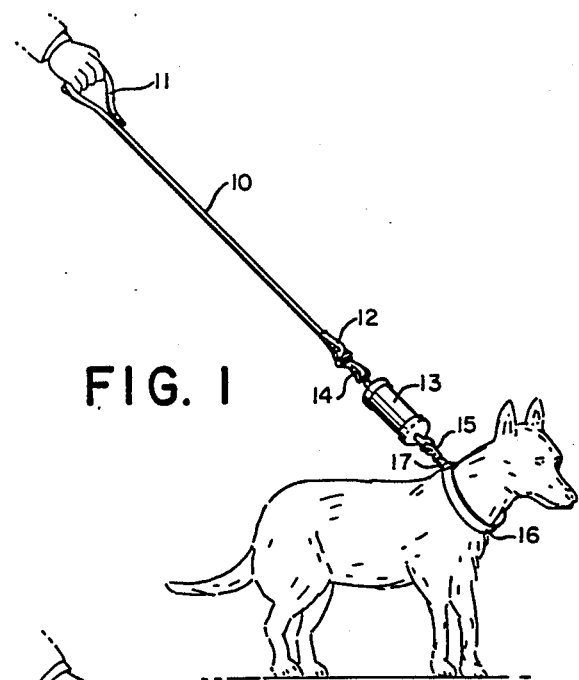
FIG. 1
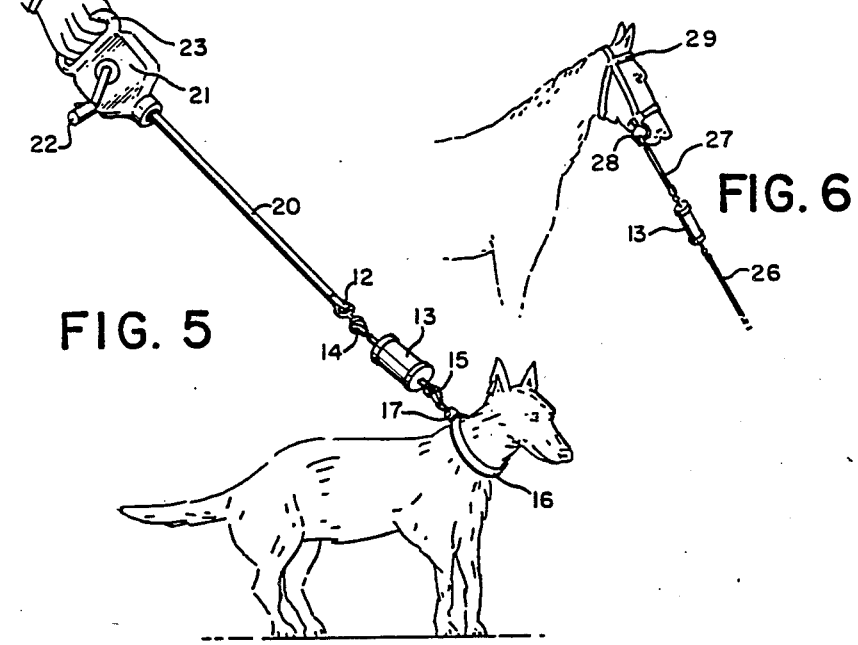
FIG. 5
FIG. 6

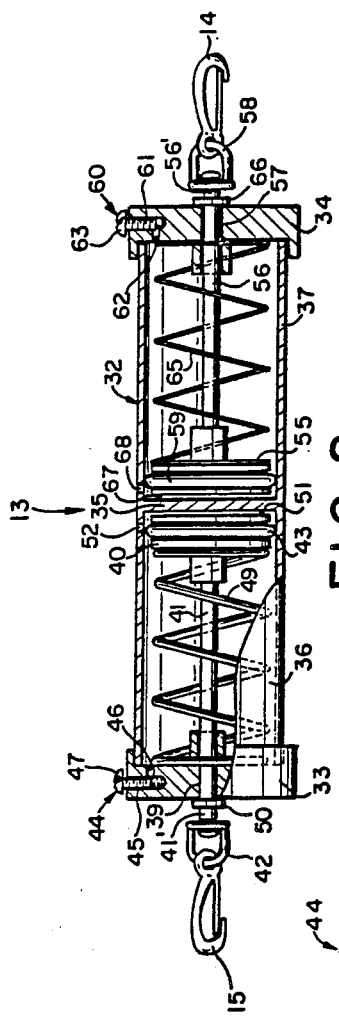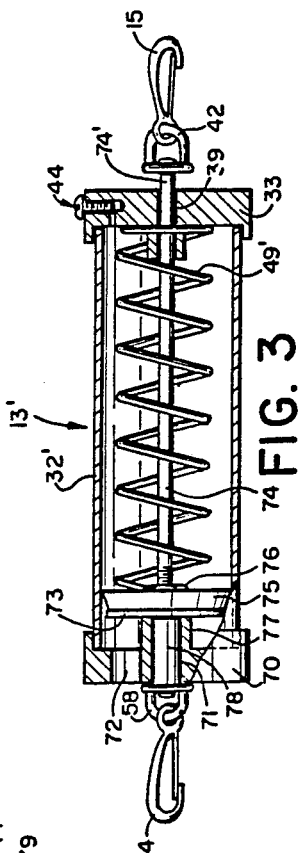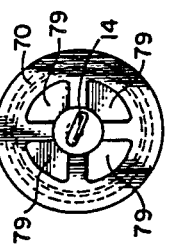

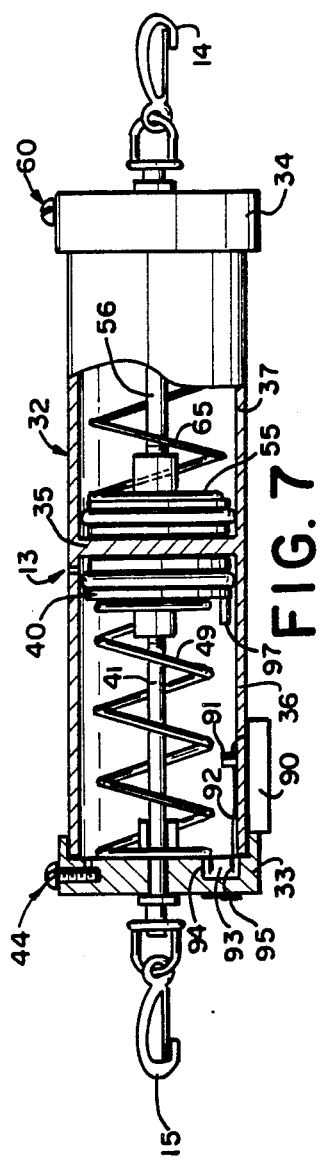
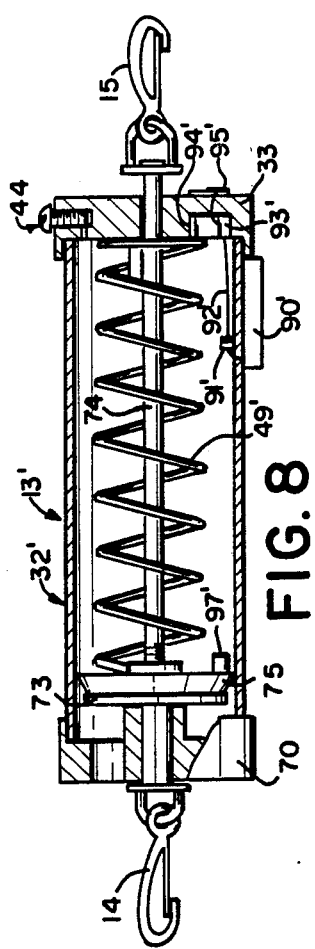

SHOCK-ABSORBENT CONNECTOR

RELATED APPLICATION

This application is a continuation-in-part of my pending U.S. patent application Ser. No. 678,711 filed Dec. 6, 1984 entitled "Shock-Absorbent Connector" now abandoned, which, in turn, is a continuation-in-part of my U.S. patent application Ser. No. 473,045 filed Mar. 7, 1983 entitled "Shock-Absorbent Leash for Animals", now U.S. Pat. No. 4,488,511.

BACKGROUND OF THE INVENTION

The invention relates to an improvement in connectors utilized for joining together two separate entities, bodies or objects which may be subjected to a sudden pull, force or strain. The invention includes in particular an improvement in leashes, leads, lines and like connectors for restraining and controlling large animals. But it has a variety of other, generally similar, applications to line-like connectors, such as vehicle tow lines, tie-down lines for aircraft, tent guy ropes, mooring lines for boats, swing chains, expansible connectors for exercise equipment, and the like.

The invention especially is applicable to manually held leashes, leads or lines used when walking or exercising large animals, such as a horse or a large dog. which may tug vigorously or forcibly on the leash, or may suddenly pull, lunge or bolt, thereby severely yanking or jerking the leash. The shock of such sudden activity can be severe, and can result in painful injuries to the person holding the leash. Frequently, with a particularly large and strong animal, a sudden lunge or bolt can pull the leash from the grip of the person who is walking or otherwise controlling the animal.

Numerous attempts have been made to provide flexible or expansible leashes or leads for animals, such as dogs, for absorbing the shock of a sudden pull or jerk when the animal jumps, bolts or lunges. However, such prior devices do not appear to have been very effective in practical use, and apparently have received very little, if any, widespread usage. A problem inherent in such prior flexible or extensible animal leashes is the absence of any selectively controllable shock absorbing mechanism by which, in practical use, adjustments may be made to adapt the leash to the particular rigors of use to which it is exposed, such as size, temperament and type of animal. Samples of such prior devices are illustrated by the following U.S. Pat. Nos. 1,924,596, 2,275,701, 2,337,970, 2,737,154, 2,911,947 and 3,441,005.

SUMMARY OF THE INVENTION

The primary object of this invention is to provide a new and improved line-type connector for joining together two separate entities, bodies or objects, temporarily or permanently, such connector including a novel device for absorbing shock resulting from a sudden pull, force or strain imposed on the connector. The novel shock-absorbent device of the invention is adapted to minimize the shock or strain transmitted through the connector as a result of a sudden and extreme force, pull, or the like exerted thereon.

A particular object of the invention is to provide a novel leash, lead or line for large and strong animals which incorporates a device, intermediate its ends or extremities, adapted to absorb and diminish substantially the effect of the severe force which may be exerted by an animal, thereby reducing the potential for injury to the person controlling the animal.

A further object is to provide a new and improved manually held leash for animals which is adapted to absorb and minimize the resulting shock or force should the animal lunge or jump, or attempt to bolt or run, or simply pull with an excess of force, to the discomfort and possible injury of the person handling the animal.

The shock absorber of the invention may be interposed between an object, such as an animal, and a conventional linetype connector, such as a leash by which the animal normally is controlled. In one preferred form, the shock absorbing device constitutes a two-part unit, each part containing selectively controllable resilient means for absorbing shock or force. The resilient means may constitute compressive coil springs, pneumatic cylinders, or a combination thereof. The individual parts of the two-part unit are operative independently of each other, and may be separately controlled by independent adjustment means. One part functions preliminarily to react to, and absorb and diminish or minimize, the initial effect of a pull, force, or strain exerted on the connector, as in the case of an animal lunging or bolting on a leash. The other part of the two-part unit is adapted to further reduce the degree of force transmitted to the connector. The two-part unit, in its preferred form, is a compound pneumatic cylinder, which communicates with the ambient atmosphere through selectively adjustable air valves, and is provided internally with pistons and one or more coil springs.

The shock absorbing device may constitute a single cylinder having an internally slidable piston and an internal coil spring adapted to retain the piston in a retracted position in the cylinder. The spring-biased piston is connected to an object such as an animal and is operative to oppose and absorb the force exerted by the animal on the connector should it lunge, jump or bolt. In addition to the restraining force of the spring, compressed air also is utilized to absorb the shock of such force, whereby the cylinder and piston perform in the manner of a pneumatic dampening device or dashpot. An adjustable air valve may be utilized to control the rate of flow of atmospheric air to and from the cylinder, to control selectively its shock absorbing resilience.

Although the preferred fluid for the shock absorbing device is air, the invention contemplates the use, also, of equivalent fluids. It is within the scope of the invention to utilize hydraulic means, such as a hydraulic cylinder with suitable flow control mechanism, or a gas cylinder utilizing a gas other than atmospheric air and provided with suitable gas flow and control structure.

It also is within the scope of this invention to include in the shock absorbing device a suitable command sound, such as a recorded voice, or a bell, buzzer or the like, which is actuated under controlled circumstances, such as the imposition of a selected pulling force, and which is operative to order the animal to halt, sit or otherwise cease its troublesome activity.

So far as is presently known this invention provides, for the first time, a selectively controllable shock absorber incorporating resilient means for minimizing the shock and possible injury resulting from the sudden and excessive activity of a large and strong animal being controlled or restrained manually by means of a connector such as a leash, lead or line.

DESCRIPTION OF THE FIGURES OF THE DRAWING

FIG. 1 is a view in side elevation showing a preferred embodiment of the shock absorbent connector of this invention.

FIG. 2 is an enlarged, partially sectioned view in side elevation of a preferred shock absorber of the invention.

FIG. 3 is a view similar to FIG. 2 showing a modified shock absorber.

FIG. 4 is a view in front elevation showing a second modification of the shock absorber.

FIGS. 5 and 6 illustrate other utilizations of the invention.

FIGS. 7 and 8 are views comparable, respectively, to FIGS. 2 and 3 illustrating a modification of the invention utilizing an electrically actuated sound command.

DETAILED DESCRIPTION OF THE PREFERRED EMBODIMENT

FIG. 1 illustrates a preferred embodiment of this invention applied to a connector in the form of a dog leash 10 having at its upper end a loop 11 with which the leash may be clasped manually, and having at its lower end a snap fastener 12. The leash 10 may be made of any suitable material, such as leather, rubber, plastic, chain metal, etc. Interposed between the end 12 of the leash and the dog collar 16 is the shock absorber 13 of this invention having snap fasteners 14, 15 at either end. Fastener 14 is attached to fastener 12 of leash 10, while fastener 15 is attached to a ring 17 suitably affixed to the collar 16.

FIGS. 5 and 6 illustrate other preferred modifications of the invention. In FIG. 5, there is illustrated a dog leash 20 connected to the cylindrical shock absorber 13 by snap fasteners 12, 14. The dog leash 20 of FIG. 5 is of the roll-up type and may be wound onto a suitable reel (not shown) internally of casing 21 by a manual handle 22. The internal construction of casing 21, containing the wind-up reel and other related parts, is well known and constitutes no part of this invention. Casing 21 is provided with a manual clasp or handle 23.

FIG. 6 shows the application of this invention to a lead 26 or similar connector for a relatively large animal, such as a horse. The lead 26 is attached to the shock absorber 13 which, in turn, is attached to a strap 27 clasped to the ring 28 affixed to the horse's halter 29. The connection between the lead 26, shock absorber 13, strap 27 and halter ring 28 may be snap fasteners of the type illustrated in FIGS. 1 and 5.

Turning to FIG. 2, the construction of the shock absorber 13 now will be described. Shock absorber 13 is a two-part unit preferably comprising an elongated double air cylinder 32 provided with a front end cap or wall 33 and a rear end cap or wall 34. The interior of the compound cylinder 32 is provided with a centrally disposed, transverse, impervious wall 35 to divide the device into a front air cylinder portion 36 and a rear air cylinder portion 37.

Slidably disposed within the front cylinder 36 is a piston 40 having an axially disposed cylindrical rod 41 affixed thereto. Piston rod 41 extends forwardly of the cylinder 36, and passes through an axial bore 39 in the front end cap 33 and is axially slidable relative thereto. Suitably disposed on the external end 41' of the piston rod 41 is a swivel 42, to which is attached the snap fastener 15 connected to the animal or other object as illustrated in FIG. 1. Suitably mounted on the piston 40 is a piston ring 43.

Flow of air from the ambient atmosphere to and from the interior of the cylinder 36 is controlled by a selectively adjustable air valve 44. The air valve 44 consists of a threaded hole 45 drilled in the front end cap 33, a conduit 46 by which hole 45 communicates with the interior of cylinder 36 and a threaded screw 47 selectively engageable threadingly internally of the hole 45. The rate at which air is permitted to flow into, or be discharged from, the interior of cylinder 36 is governed selectively by adjusting the position of screw 47 in threaded hole 45 relative to conduit 46.

Freely disposed around the piston rod 41, internally of the cylinder 36, is a coil spring 49 extending between the inner surface of the end cap 33 and the piston 40. The compressive force of spring 49 urges piston 40 inwardly of cylinder 39, in the direction of the interior wall 35, to the extent permitted by the annular flange 50 formed on the external portion 41' of the piston rod 41. Flange 50 functions as a stop and limits the inward displacement of the piston 40. When the piston is in its innermost position, a small gap 51 is formed between the piston and the internal wall 35. A port 52 in the wall of cylinder 36 permits the gap 51 to communicate with the ambient atmosphere.

The construction of rear cylinder 37 and its associated parts is essentially identical to that of front cylinder 36. Slidably disposed in cylinder 37 is piston 55 having piston rod 56 extending through axial bore 57 in the rear end plate 34 of the compound pneumatic cylinder 32. Piston 55 is provided with a piston ring 59, and the outer end of piston rod 56' is provided with a swivel 58 to which is affixed the snap fastener 14 connected to dog leash 10, as indicated in FIG. 1.

Cylinder 37 is provided with an adjustable air valve 60 composed of threaded hole 61 formed in the rear end cap 34, conduit 62 interposed between the interior of rear cylinder 37 and hole 61 and threaded screw 63 engaged threadingly in the hole 61 with capacity for selective adjustment to control the rate of flow of air into and out of cylinder 37.

Disposed internally of the rear cylinder 37, about the piston rod 56, is a coil spring 65 extending between the piston 55 and rear end cap 34. Spring 65 urges the piston 55 inwardly of the cylinder 37 to the extent permitted by the annular stop 66 on piston rod 56. The small gap 67 formed between the interior cylinder wall 35 and the piston 55 is exposed to the ambient atmosphere by means of port 68.

The springs 49, 65 yieldingly oppose the advance of the pistons 40, 55 in their cylinders 36, 37 when a pulling force is exerted on the piston rods 41, 56. Preferably, the internal coil spring 49 is a stronger, more resistant spring than coil spring 65. The springs 49, 65 may be conventional compression springs of helical configuration constituted of steel or other appropriate metallic composition. If the ratio strength between the two springs is 2:1, for example, the springs 49, 65 may comprise, respectively, 20 pound and 10 pound compressive stainless steel springs. Of course, it is within the scope of the invention to reverse the arrangement of springs illustrated in FIG. 2, and dispose the lighter spring 65 internally of cylinder 36, and dispose the heavier spring 49 internally of cylinder 37.

In practice, the strength of the lighter spring 65 may be such that, upon the jolting or lunging pull of an animal, spring 65 is fully compressed, and its piston 55 is fully advanced, before any movement is imparted to piston 40 against the heavier spring 49. In such arrangement, the yielding resistance of rhe spring 65 would be fully depleted before the yielding resistance of spring 49 becomes effective. However, the relative strength of the two springs 65, 49 is a matter of selected design. For example, the relative strength of the two springs 65, 49 may be such that, after spring 65 is partially compressed, for example to the extent required to permit piston 55 to advance 60% of its full stroke within cylinder 37, piston 40 then may commence to advance against the yielding resistance of its spring 49.

Selective adjustment of the air valves 44, 60 also is utilized to control the forces required to advance the pistons 40, 55 relative to their respective cylinders 36, 37. For example, by adjusting air valve 44 to reduce the rate of discharge of air from within the cylinder 36, the internal air pressure acting on the piston 40, as it is caused to advance within cylinder 36, is increased. Such increase in air pressure retards the advance of the piston 40, and increases, in proportion, the force required to move it.

By selectively adjusting the valves 44, 60—whereby air discharges from cylinder 36 at a relatively slow rate as piston 40 is advanced, whereas air escapes from within cylinder 37 at a relatively rapid rate as piston 55 is advanced—a selectively larger force must be exerted on piston rod 41 to advance piston 40 in comparison to the force required to be exerted on piston rod 56 to advance piston 55. Thus, like the springs 49, 65, the selectively controlled compressed air in the cylinders 36, 37 functions as a resilient means yieldingly opposing the advance of the pistons 40, 55 when pulling forces are exerted on the piston rods 41, 56.

When the shock absorber 13 is utilized in the manner illustrated in FIGS. 1, 5 and 6, it consitutes a part or an extension of the connectors 10, 20, 26 by which the animal is manually held, restrained or controlled, as when walking a dog or exercising a horse. Snap fastener 15 connects the front pneumatic cylinder 36 of the shock absorber 13 to the animal, and snap fastener 14 connects the rear pneumatic cylinder 37 to the manually held connectors. If the animal pulls severely, or lunges, bolts or jumps, the resulting force is transmitted to the connectors 10, 20, 26 and absorbed and diminished controllably by the shock absorber 13.

Since the resilient forces yieldingly opposing piston 55 are less than those opposing piston 40, the pulling force of the animal initially causes piston 55 to advance against spring 65 and the compressed air in cylinder 37 discharging therefrom at a controlled rate through the adjustable air valve 60. The combined resilient forces in the cylinder 37 absorb and diminish the initial effect of the force exerted by the animal by yieldingly opposing, and thus retarding, the advance of the piston 55 relative to its cylinder 37.

Pneumatic cylinder 36 and its associated parts are operative to supplement the shock absorbing function of pneumatic cylinder 37. Where the pulling force of the animal is excessive, and overcomes the initial resistance provided by the cylinder 37 and its associated parts, or where the pulling force of the animal continues for a sustained period, piston 40 will be caused to advance against the yielding, resilient forces exerted by the spring 49 and the compressed air, under the control of air valve 44, in cylinder 36. In the manner explained previously, the resilient forces exerted yieldingly on piston 40 will further absorb and reduce the animal's pulling force transmitted to the manually held leash. Thus, by reason of its two shock absorbing units 36, 37 operating in the manner described, shock absorber 13 functions to substantially reduce the possibility of serious injury to a person holding the connectors 10, 20, 26.

If desired, one or both of the coil springs 49, 65 may be eliminated, and the resilient force yieldingly exerted on the pistons 40, 55 may be provided solely by the selectively controlled air pressures in the cylinder 36, 37.

The component parts of the shock absorber 13 may be made of any suitable strong, rigid and lightweight materials, such as aluminum, stainless steel or moldable plastics, such as polypropylene, high impact polystyrene, nylon, etc. The snap fasteners 14, 15, swivels 42, 58, piston rods 41, 56 and pistons 40, 55 may be composed of metal. The piston rings 43, 59 may be made of a suitable non-metallic material such as the plastic known in the trade as "Teflon".

FIG. 3 illustrates a modified shock absorber 13' comprising an elongated pneumatic cylinder 32' provided with a front end cap 33 and a rear end cap 70. The front end cap 33 shown in FIG. 3 is identical in construction to front end cap 33 of FIG. 2, and includes the same axial bore 39 and adjustable air valve 44.

Slidably disposed within cylinder 32' is a piston 73 having an axially extending cylindrical rod 74 affixed thereto. Piston rod 74 extends forwardly of the cylinder 32', and passes slidably through the axial bore 39 in the front end cap 33, and terminates in an external end 74' on which is mounted the swivel 42. The piston 73 includes a flexible cup 75 which outwardly into fluid-tight contact with the inner surface of the cylinder 32'. The flexible cup 75 is tightly secured to the piston 73 by a nut 76 engaged threadingly on the inner end of the piston rod 74. To ensure its fluid-tight relationship with the cylinder 32', the flexible cup referably is made of rubber or neoprene.

The compressive force of the coil spring 49' urges the piston 73 inwardly of the cylinder 32', in the direction of the rear end cap 70. A boss 77 formed on the inner surface of rear end cap 70, and extending a short distance into the hollow of cylinder 32', functions as a stop and limits the extent to which spring 49' causes piston 73 to be retracted into the cylinder 32'. The interior of the rear portion of the cylinder 32', disposed between rear end cap 70 and the piston 73, communicates with the ambient atmosphere by means of air conduit 72 in the end cap 70.

An axially extending hole 71 formed in the rear end cap 70 retains the inner end of an axially extending rod 78, to the outer end of which is affixed the swivel 58. Preferably, the inner end of rod 78 is force fitted into the hole 71 which, as illustrated in FIG. 3, may extend internally of the boss 77.

Pneumatic cylinder 32' and its associated parts function in a manner generally similar to the operation described in respect to pneumaric cylinders 36, 37. When an animal pulls excessively, or lunges, bolts or jumps, its pulling force is transmitted through snap fastener 15, swivel 42 and piston rod 74 to piston 73, which is caused to advance against the resilient, yielding forces exerted by coil spring 49' and the compressed air internally of cylinder 32' under the control of the adjustable air valve 44. Thus, shock absorber 13' functions to absorb and diminish the shock of the pulling force of the animal as it is transmitted through the shock absorber, rod 78, swivel 58 and snap fastener 14 to the manually held connectors or leashes 10, 20, 26. When the pulling force of the animal diminishes, spring 49' retracts piston 73 rearwardly of the cylinder 32' to the position illustrated in FIG. 3. As the piston 73 is retracted, air flows into the forward portion of the cylinder 32', via the air valve 44, and discharges from the rear portion of the cylinder via conduit 72.

The modification of the shock absorber 13' illustrated in FIG. 4 differs from the construction illustrated in FIG. 3 only in that the air conduit 72 formed in the rear wall 70 is replaced by a plurality of openings or holes 79 by which the hollow of the cylinder 32', disposed rearwardly of the piston 73, communicates with the ambient atmosphere.

The modified shock absorber 13' of FIGS. 3 and 4 may be reversed in use, whereby snap fastener 14 may be attached to the animal and snap fastener 15 may be attached to the leashes 10, 20, 26. Also, the invention is fully applicable to dog runs where the animal is secured by a line connector to an overhead trolley or to a ground swivel. The incorporation of the shock absorbent device 13, 13' of this invention into such a connector has the highly beneficial effect of reducing possible injury to the animal should it lunge, jump or bolt, or pull severely on such a non-manually held leash.

Thus, as broadly envisioned and applied, the invention constitutes a new and improved shock absorbent line or line-type connector 10, 20, 26 having clasping or fastening means 11, 15, or 23 at its opposite ends, intermediate of which is disposed the novel shock absorbing device 13, 13' of this invention. As explained previously, this invention is applicable to a variety of uses or embodiments, such as tow lines, tie-down lines, tent guy ropes, mooring lines, swing chains, exercise equipment, and the like. The connector may assume the form illustrated in FIG. 1, in which the shock absorber 13 is incorporated into a line-type connector 10 immediately adjacent one of its clasping means 15. Alternatively, it may assume the form illustrated in FIG. 6, wherein the shock absorber 13 is intermediate of and spaced from both clasping means at the ends of the connector 26.

In FIGS. 1 and 5, the two separated objects joined together by the connectors 10, 20 are the animal and the person holding the leash. In FIG. 6, one of the objects is a different type of animal. But the two objects joined together temporarily or permanently by the shock-absorbent connector of the invention may assume a variety of forms, such as two motor vehicles joined by a tow, a child's playground swing supported by a pair of chains, mooring lines for a boat, etc. In all such applications, the shock-absorbent connector would function in the manner illustrated in the attached drawing in respect of connectors 10, 20, 26 and shock absorbers 13, 13'.

FIG. 7 illustrates the shock absorber of FIG. 2 provided with an electrically controlled, automatically operative, command sound system which, under controlled circumstances, is operative to emit a noise ordering an animal to halt, sit or otherwise cease troublesome activity. More specifically, shock absorber 13 may be provided with an external power supply 90, such as a battery, solar cell, or the like. Preferably, power supply 90 is secured to the outside surface of the front cylinder 36 by any conventional means such as, for example, spot welding. Power supply 90 is suitably connected electrically through the wall of cylinder 36 to a moveable or mechanically actuatable electrical contact 91 disposed internally of that cylinder. Contact 91, in turn, is connected electrically, internally of cylinder 96, to a microchip 93 by means of suitable electric leads 92. Microchip 93 is disposed snugly within a recess 94 formed in the front end cap 33 of shock absorber 13. Preferably, an on-off switch 95 is mounted externally of the end cap 33, and is connected electrically to the electrical system composed of power supply 90, contact 91, leads 92 and microchip 93.

The microchip 93 includes an amplifier (not shown). It is pre-programmed to broadcast a command sound, such as a recorded voice, bell, buzzer, clicking sound or the like, for the purpose of ordering an animal to halt, sit or otherwise cease troublesome activity in which it may be engaged, such as vigorously pulling or jerking on a leash or line by which it is being held. When the piston 40 is in its retracted position internally of cylinder 36, as illustrated in FIG. 7, the electrical circuit comprising power supply 90, contact 91, leads 92 and microchip 93 is open, and the sound component of the microchip is idled.

Piston 40 is provided with a forwardly extending protuberance 97 which is aligned linearly with the actuatable electrical contact 91. Protuberance 97 is adapted to make contact with contact 91 after piston 40 has been advanced a selected distance internally of cylinder 36 against the yielding opposition of spring 49 and the compressed air in the cylinder. When piston 40 has advanced sufficiently toward end cap 33, protuberance 97 strikes contact 91 and actuates that contact to close the circuit constituted of power supply 90, contact 91, leads 92 and microchip 93. As a result, the sound component of the microchip is actuated and broadcasts the selected command or commands to the animal. As soon as the animal ceases its physical activity, spring 49 within cylinder 36 starts to retract piston 40, whereby protuberance 97 separates from contact 91. The latter returns automatically to its open circuit position, thereby deactivating the electrical circuit to the microchip 93. The sound commands cease.

The microchip 93 may be programmed selectively as desired to emit, either periodically or continuously suitable command sounds to which the animal will be responsive and which he will obey, thereby bringing to a halt the troublesome physical activity in which he may have been engaged. The on-off switch 95 is operative to deactivate completely the electrical circuitry, when desired, so that it may be inoperative when protuberance 97 strikes the electrical contact 91.

FIG. 8 illustrates the shock absorber of FIG. 3 provided with the same electrically operated command sound system, including an electrical system composed of power supply 90', actuatable electrical contact 91', electric leads 92' and a sound-emitting microchip 93'. Preferably, power supply 90' is affixed externally of the cylinder 32', and contact 91' is mounted moveably internally thereof. An on-off electrical switch 95' is mounted externally of the end cap 33, to activate and deactivate, as desired, the electrically operable sound system composed of power supply 90', contact 91', leads 92' and microchip 93'.

In the same manner as described in respect to the embodiment illustrated in FIG. 7, when the piston 73 and flexible cup 75 are advanced a selected distance internally of the cylinder 32' toward end cap 33, the protuberance 97' affixed to piston 73 advances into contact with, and thus actuates, the moveable electrical contact 91' to close and activate the electric sound command system of the invention.

Although preferred embodiments of this invention have been disclosed in detail for the purpose of illustration, it will be understood that the invention may find expression in alternate embodiments thereof and that various changes and modifications may be made to the embodiments illustrated herein without departing from the spirit of the invention or the scope thereof as set forth in the claims.

I claim:

1. In a line connector having a clasping means at each end for joining two objects together, a device for absorbing shock resulting from sudden pull on the connector comprising
   (a) a hollow cylinder including a piston disposed slidably therein,
   (b) a cylinder end cap,
   (c) a piston rod connected to the piston and extending through the end cap outwardly of the cylinder,
   (d) fastening means for attaching the connector to the cylinder externally of the cylinder, whereby force from the pull on the connector is transmitted to the piston to cause the piston to advance in the cylinder toward the end cap,
   (e) air conduit means in the end cap connecting the interior of the cylinder to the ambient atmosphere and
   (f) an adjustable valve located in the air conduit means,
   (g) said valve being operative to regulate discharge of air from the cylinder as the piston advances toward the end cap to control selectively compression of air within the cylinder, between the piston and the end cap, upon advancement of the piston, said compressed air within the cylinder functioning as resilient means yieldingly resisting the advance of the piston.

2. The connector of claim 1, further including a mechanical spring disposed externally of the piston rod between the piston and the end cap.

3. The connector of claim 1, further including
   (a) a transverse wall located internally of the hollow cylinder to divide the cylinder into a front cylinder and rear cylinder, said front and rear cylinders each having an outer end and an inner end adjacent the transverse wall,
   (b) a piston disposed slidably in each cylinder,
   (c) a piston rod connected to each piston and extending outwardly of each cylinder beyond its outer end,
   (d) a first fastening means for attaching one piston rod to the connector and
   (e) a second fastening means for attaching the other piston rod to the connector.

4. The connector of claim 3, wherein each cylinder has
   (a) an end cap disposed at its outer end and
   (b) a mechanical spring extending between its piston and its end cap.

5. The connector of claim 3, further including
   (a) an end cap disposed at the outer end of each cylinder,
   (b) air conduit means in each end cap connecting the interior of each cylinder to the ambient atmosphere and
   (c) an adjustable valve located in each air conduit means, said valves being operative to regulate the rate of discharge of air from the cylinders upon advancement of the pistons in the cylinders in response to the pull on the connector.

6. The connector of claim 5, wherein the adjustable valves are operative to control selectively compression of the air in the cylinders upo advancement of the pistons.

7. The connector of claim 3, further including
   (a) end caps covering the outer ends of each cylinder,
   (b) an aperture in each end cap through which one of the piston rods extends and
   (c) a mechanical spring disposed in each cylinder between the piston and the end cap of each said cylinder,
   (d) said springs being operative to retract the pistons from the end caps inwardly of their respective cylinders and to yieldingly resist advancement of the pistons toward the end caps of their respective cylinders in response to the pulling force on the connector.

8. The connector of claim 7, wherein said springs are of unequal strength.

9. The connector of claim 1, further including an electrically operative sound emitting system comprising
   (a) a power supply affixed to the device for absorbing shock,
   (b) an actuatable electrical contact connected to the power supply,
   (c) a sound emitting microchip,
   (d) electrical leads connecting the microchip to the actuatable electric contact and
   (e) actuating means mounted on the piston and operative, after the piston has advanced a selected distance toward the end cap, to actuate the electrical contact to activate the sound emitting microchip.

10. A shock absorbent device for incorporation into a line-type connector for joining two objects together, said device being disposed intermediate the ends of the connector for absorbing shock resulting from a force exerted on the connector, comprising
    (a) a hollow cylinder having a piston disposed slidably therein, said cylinder having a front end proximate an object and a rear end proximate the connector,
    (b) a piston rod connected to the piston and extending outwardly from one end of the cylinder,
    (c) a cylinder end cap having an aperture through which the piston rod extends externally of the cylinder,
    (d) fastening means mounted adjacent each end of the cylinder for attaching the cylinder to the object and to the connector, one said fastening means being affixed to the piston rod whereby force exerted on the connector is transmitted to the piston to cause the piston to advance in the cylinder toward the end cap,
    (e) air conduit means in the end cap for connecting the interior of the cylinder to the ambient atmosphere and
    (f) adjustment means located in the air conduit means, said adjustment means being operative to regulate selectively the rate of discharge of air from the cylinder upon advancement of the piston toward the end cap,
    (g) whereby compression of the air within the cylinder between the piston and the end cap may be controlled selectively as the piston advances, said compressed air within the cylinder functioning as resilient means yieldingly resisting the advance of the piston.

11. The shock absorbent device of claim 10 wherein
(a) the hollow cylinder is constituted of a front cylinder and rear cylinder, said front and rear cylinders each having an outer end,
(b) a piston is disposed slidably in each cylinder,
(c) a piston rod is connected to each piston and extends outwardly of each cylinder beyond its outer end,
(d) the fastening means are mounted on said piston rods externally of the cylinders and
(e) a mechanical spring is disposed in each cylinder between the piston and the outer end of each cylinder for yieldingly resisting the advance of the pistons in the cylinders in response to the force resulting from the pull on the connector.

12. The shock absorbent device of claim 10, further including a sound emitting system constituted by an electrical circuit having
(a) a power supply affixed to the cylinder,
(b) a moveable electrical contact connected to the power supply,
(c) a sound emitting microchip,
(d) electrical leads connecting the microchip to the moveable electric contact, and
(e) actuating means mounted on the piston and operative, after the piston has advanced a selected distance toward the end cap, to strike and move the electrical contact to close the electric circuit and activate the sound emitting microchip.

13. A shock absorber for a connector joining two objects together for absorbing shock resulting from sudden force exerted on the connector, comprising
(a) a hollow double cylinder,
(b) a transverse wall located internally of the double cylinder to divide said cylinder into a single front cylinder and a single rear cylinder, said single cylinders each having outer ends,
(c) an end wall disposed at the outer end of each single cylinder,
(d) a piston disposed slidably in each single cylinder,
(e) a piston rod connected to each piston and extending outwardly of each single cylinder through the end wall thereof,
(f) fastening means mounted on each of the piston rods externally of the double cylinder for attaching said cylinder to an object and to the connector whereby force exerted on the connector is transmitted to the pistons to cause the pistons to advance in their respective single cylinders toward the respective end walls,
(g) air conduits in each end wall connecting the interior of each single cylinder to the ambient atmosphere and
(h) adjustment means located in the air conduits, said adjustment means being operative to regulate selectively the rate of discharge of air from the single cylinders upon advancement of their pistons toward the end caps,
(i) whereby compression of the air within the single cylinders between the pistons and the end caps may be controlled selectively as said pistons advance, said compressed air within the cylinders functioning as resilient means yieldingly resisting the advance of the pistons in their respective cylinders.

14. The shock absorber of claim 13, further including a mechanical spring disposed in each single cylinder between the piston and the end wall of each said cylinder, said springs being operative to retract the pistons from the end walls inwardly of their respective single cylinders and to yieldingly resist advancement of the pistons toward the end walls of their respective cylinders in response to the force exerted on the connector.

15. The shock absorber of claim 14, wherein the springs are of an unequal strength.

16. The shock absorber of claim 13, further including an electrically operative sound emitting system comprising
(a) a power supply affixed to the double cylinder,
(b) an actuatable electric contact disposed internally of one of said single cylinders and connected to the power supply,
(c) a sound emitting microchip supported by the double cylinder,
(d) electric leads connecting the microchip to the actuatable electric contact and
(e) actuating means mounted on the piston in said single cylinder and operative, after said piston has advanced a selected distance toward the end wall, to actuate the electrical contact to close the electric circuit and activate the sound emitting microchip.

* * * * *